United States Patent [19]
Castleman, Jr. et al.

[11] 3,922,749
[45] Dec. 2, 1975

[54] ADJUSTABLE WINDSHIELD WIPER BLADE

[75] Inventors: Curtis H. Castleman, Jr., Evergreen; Irwin C. Cone, Littleton, both of Colo.

[73] Assignee: The Gates Rubber Company, Denver, Colo.

[22] Filed: Mar. 20, 1974

[21] Appl. No.: 452,855

[52] U.S. Cl. ........ 15/250.42; 15/250.32; 15/250.39
[51] Int. Cl.² ...................... B60S 1/04; B60S 1/40
[58] Field of Search ....... 15/250.31, 250.32, 250.36, 15/250.38, 250.39, 250.42

[56] References Cited
UNITED STATES PATENTS

| 1,573,618 | 2/1926 | Laganke | 15/250.35 |
| 1,662,290 | 3/1928 | Arey | 15/250.39 X |
| 2,713,695 | 7/1955 | Oishei | 15/250.39 |
| 3,846,864 | 11/1974 | Baut et al. | 15/250.42 |

FOREIGN PATENTS OR APPLICATIONS

| 583,367 | 9/1933 | Germany | 15/250.41 |

Primary Examiner—Peter Feldman
Attorney, Agent, or Firm—Curtis H. Castleman, Jr.; Raymond Fink; H. W. Oberg, Jr.

[57] ABSTRACT

An adjustable windshield wiper blade is described having a series of interconnected yokes or lever members for transmitting and distributing wiper arm pressure to a wiping member. The interconnecting or attachment points between any one or more of the arm connector with the primary yoke, the primary yoke with one or more of the secondary yokes, respectively, is selectively adjustable to provide the desired force distribution pattern applied to the wiping member.

11 Claims, 8 Drawing Figures

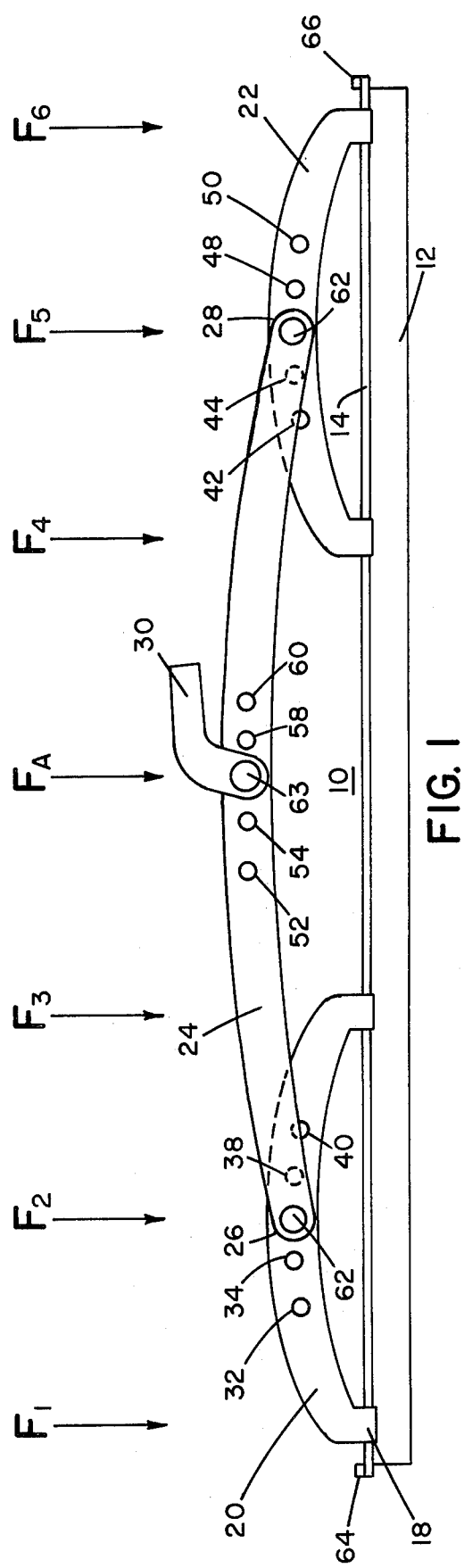
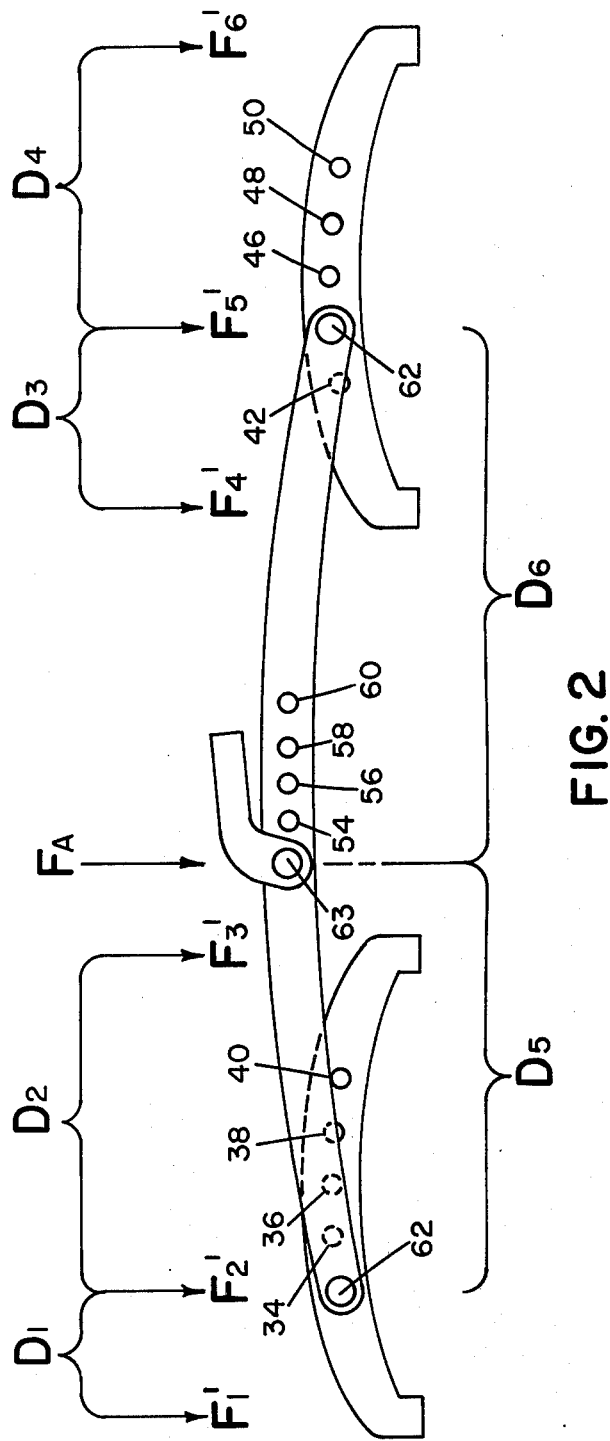

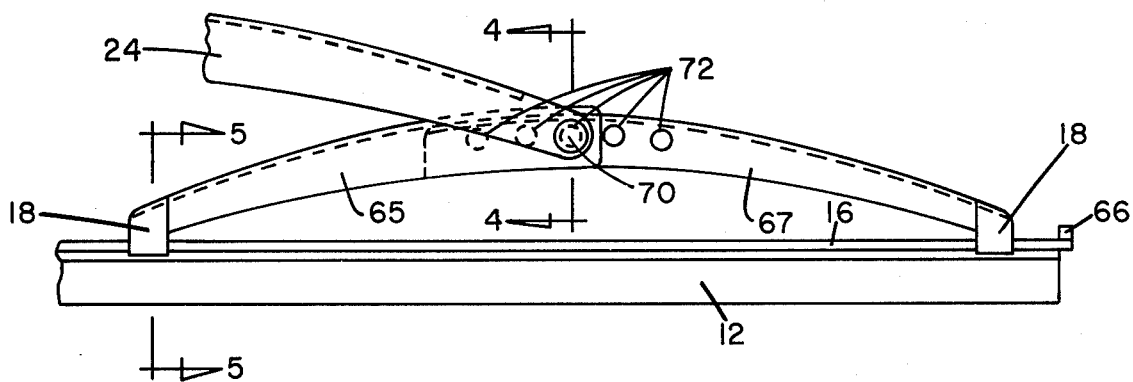
FIG. 3
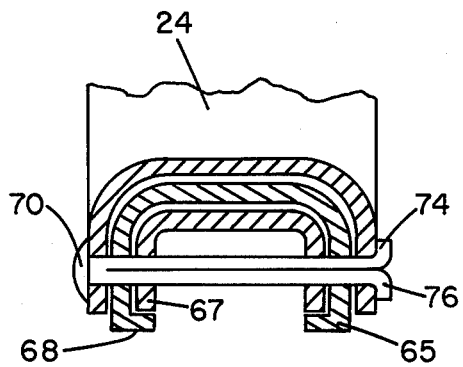
FIG. 4
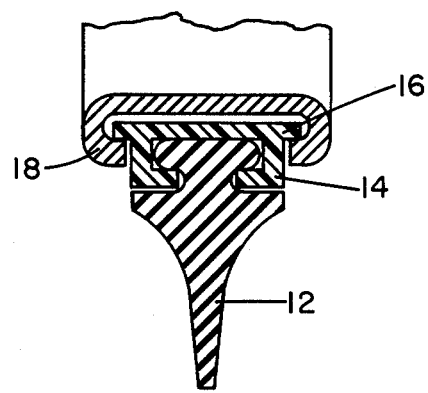
FIG. 5
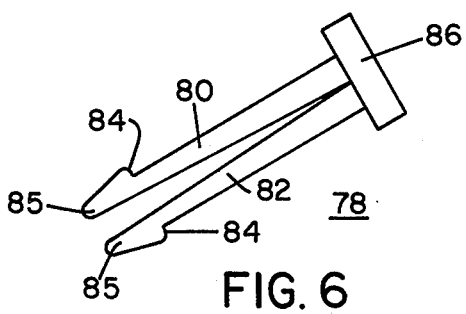
FIG. 6
FIG. 7
FIG. 8

ADJUSTABLE WINDSHIELD WIPER BLADE

BACKGROUND OF THE INVENTION

This invention relates to windshield wiper apparatus and in particular to windshield wiper blades having a plurality of interconnected yoke members for transmitting wiper arm loading to a wiping element.

In a typical windshield wiper blade the superstructure is formed of a centrally disposed primary yoke whose respective ends are mounted pivotally to the mid-points of a pair of secondary yokes. Each of the secondary yokes generally has two pairs of appended claws which slidably engage a wiping element retention member, also known as a backing strip. This piggy-back configuration of the superstructure provides essentially equal distribution and transmission of the arm pressure load through each of the four claws. The claw attachment points are generally equally spaced from the center of the blade (taken through a central transverse plane intersecting the arm connection point with the primary yoke) providing a symmetric distribution of such forces with respect to the central plane, as defined.

There are some windshield wiper blade constructions whose particular superstructure arrangement produces an asymmetric distribution of claw attachment points along the length of the wiper element retention member. However, the total force from the wiper arm is still distributed equally on either side of the central plane. Other prior art constructions have permitted limited adjustability of the forces applied to the plurality of claws, such as shown in Oishei et al al. Pat. No. 2,905,961. In that patent the wiper arm pressure was selectively distributable between the central portion of the blade and the end portions of the blade by adjusting the tension of a centrally located torsional spring biased against centrally pivoted lever members. However, the U.S. Pat. No. 2,905,961 permitted adjustability and control of pressure distribution only with respect to the central plane of the blade, i.e. permitting only adjustment of pressure distribution symmetrically with respect to the central plane.

SUMMARY OF THE INVENTION

A primary object of the subject invention is to provide a wiper blade superstructure which is selectively adjustable between a plurality of discrete attachment positions for transmitting forces to a wiping element retention member at any desired sequential spacing, including in particular loading unbalanced or asymmetrical with respect to the wiper blade on either side of the central transverse plane through the connection between the primary yoke and wiper arm attachment and/or the connection between the primary and secondary yokes. It is another object of the invention to provide a windshield wiper superstructure which is adjustable to the extent that it may be used for different size (length) windshield wiper blades. It is a further object to provide for effective wiping of extremely curved windshields by selectively unbalancing the loading along the windshield wiper element to better accommodate wiping the curved portion of such windshield.

Briefly described, the invention is drawn to an improved selectively adjustable superstructure for a windshield wiping apparatus. In one aspect of the invention, the pressure distributing superstructure comprises an elongated primary yoke connectible intermediate its ends to a wiper arm supplying pressure to the wiper blade, and a pair of secondary yokes pivotally connected intermediate its end portions to the primary yoke, the pivotal connection between the primary yoke and at least one of the secondary yokes being adjustable longitudinally with respect to the blade between a plurality of pivot points. At least one of the pivot points will be spaced from the plane which transversely bisects the secondary yoke.

In another embodiment, the invention is drawn to a similarly defined superstructure in which the connection point between the wiper arm connector and the primary yoke is selectively attachable at different attachment positions spaced longitudinally along the central portion of the primary yoke to selectively distribute the wiper arm pressure on either side of the arm connector pivot points.

In another embodiment, the distance between the claws of one or more secondary yokes may be selectively predetermined by a slidable arrangement between bifurcated portions of such secondary yoke. Alternatively or in addition thereto, the primary yoke may be bifurcated permitting longitudinal distensibility or contractibility

BRIEF DESCRIPTION OF THE DRAWINGS

Certain preferred embodiments of the invention will be described in reference to the accompanying drawings, in which:

FIG. 1 is a wiper assembly of the subject invention shown in side elevation;

FIG. 2 shows the superstructure of FIG. 1 in a selected attachment position illustrating unbalanced loading which will be applied to a wiper element (not shown);

FIG. 3 is a fragmentary view of an alternative embodiment of the invention employing a bifurcated secondary yoke;

FIG. 4 is a fragmentary view along section 4—4 of FIG. 3;

FIG. 5 is a fragmentary view along section 5—5 of FIG. 3;

FIG. 6 is a side elevational view of a pivot pin useful in accordance with the invention;

FIG. 7 shows an alternative connection between a primary yoke and secondary yoke in side elevation and partially cut away; and FIG. 8 is a view taken along section 8—8 of FIG. 7.

PREFERRED EMBODIMENTS OF THE INVENTION

Referring to the various drawings, a windshield wiper generally designated 10 includes a wiping element or elastomeric squeegee 12 and its retention element or backing member 14 made of plastic or other resilient material such as spring metal. Lateral extensions or flanges 16 of the wiping element retention member are in slidable engagement with a plurality of claws or holder means 18 which also transmit the wiper arm loading force to the backing member at each of the claw attachment positions.

The claws 18 are preferably fixedly attached or integral with a plurality of secondary yokes 20, 22. A primary yoke 24 is connected at or near its ends 26, 28 to each of the secondary yokes in piggy-back fashion intermediate the ends of each of said secondary yokes. Pressure is supplied to the primary yoke and hence the entire wiper blade combination from a wiper arm (not shown) attached to connector 30 and applying a downward force $F_A$ thereto to conform the wiper blade to a windshield surface to be wiped.

According to one form of the invention, the pivotal connection between the primary yoke 24 and at least one of the secondary yokes 26, 28 is adjustable longitudinally with respect to the blade between a plurality of spaced pivot points 32, 34, 36, 38, 40 and 42, 44, 46, 48, 50, respectively. In similar fashion the attachment clip 30 may be attached to the primary yoke at alternative attachment points 52, 54, 56, 58, 60. Any convenient number of attachment points may be utilized. The actual physical connection may be made in various ways although in a preferred form of the invention a pin or rivet member 62 or 63 connects the members through aligned receiving ports in the respective members and permits relative pivotal movement. The connector is preferably removably disengageable from the connection permitting selection of an alternative attachment position as is desired.

According to the invention, the adjustability between the various connection points of the superstructure permits balanced or unbalanced distribution of the arm load force $F_A$. FIG. 1 depicts the balanced situation where the arm load reacts through a central plane transversely bisecting the wiper blade at position 56, mid-way between the ends of the blade. Likewise, the connections between the ends of the primary yoke are made at the mid-point of the secondary yokes through central pivot points 36, 46, and equal forces $F_2$ and $F_5$ react through those pivot points. In turn, $F_2$ is transmitted through the secondary yoke 20 to produce equal forces $F_1$ and $F_3$ acting through its claws 18 to apply force to the blade as desired. Similarly, $F_5$ produces equal components of force $F_4$ and $F_6$ at the opposite secondary yoke.

An unbalanced loading may be selected by utilizing a different discrete attachment position from that shown in FIG. 1 at any one or more of the connection points. In FIG. 2, each of the three attachment positions have been altered in a manner to selectively overload the left most portion of the blade which would be useful, for instance, if such left portion of the blade were to traverse acutely curved portions of a wrap-around type windshield. In the connection arrangement of FIG. 2 the connections have all been moved leftwardly; connection points 32, 52 and 44 are utilized. In this manner, application of elementary engineering statics shows that because distance $D_5$ is less than distance $D_6$, force $F_2'$ bearing on secondary yoke 20 will have a greater magnitude than force $F_5'$ acting on the opposite secondary yoke 22. Similarly, the forces transmitted from each of the claws 18 to the wiping element will also be selectively unbalanced. Thus, because distance $D_1$ is less than distance $D_2$ on either side of pivot point 32, $F_1'$ will be greater than $F_3'$ by the ratio of $D_2:D_1$, thereby selectively overloading the endmost claw of secondary yoke 20 vis-a-vis the innermost claw.

In the particular example shown in FIG. 2 the change in attachment positions has actually reduced the overall length of the blade by the distance between adjacent points, such as 32–34. The slidable engagement between the claws and backing member 14 permits such a contraction in length without adverse effect. The converse is also true to some extent where the connection points between the primary and secondary yokes may be moved inwardly with respect to the blade so as to actually distend the superstructure; in such a case it is preferred to provide some leeway between the ends of the outermost claws 18 and respective stop members 64, 66 in the normal balanced position as is shown in FIG. 1. This latter mode of attachment wherein the superstructure is distended, such as by making connections at positions 38 and 44, has been found to be quite useful in the longer length blades where the distance between the inward claws 18 of each of the secondary yokes is greater than the distance between adjacent or successive claws of a single secondary yoke (where end overloading is a problem). In this manner the forces acting through the inward claws are greater than the forces acting through the end claws. This is desirable to more evenly distribute and balance the forces along the entire length of the wiper element.

In the just described embodiment, considerable flexibility in force distribution is obtainable by varying the connection points between the secondary and primary yokes, and the primary yoke and arm attachment clip, respectively. In that example, however, a certain amount of constraint particularly in the longest and shortest blade sizes results from the invariant distance between respective ends of each secondary yoke, e.g. where distance $D_1$ plus $D_2$ is a constant. In an alternative embodiment as shown more fully in FIG. 3, the distance between the respective claw members 18 is made variable at a plurality of discrete distances by virtue of the slidable connection between two bifurcated secondary yoke portions 65 and 67. As shown in FIG. 4, the right-most member 67 is smaller than and nests within the larger member 65, the latter having juxtaposed inturned ledges 68 for restricting relative pivotal movement between the bifurcated members. Each of the bifurcated members contains one or more transverse apertures or passageways 72 for alignment therebetween and engagement by a pin member 70. The pin member may be of the cotter type having resiliently bendable ends 74, 76. In this manner a different attachment position may be selected by bending ends 74 and 76 toward one another, permitting removal of pin 70 and reinsertion upon realignment of the desired apertures 72. This type of pin and passageway connection may also be used in the previously described embodiments.

It can be seen that use of structure exemplified by FIG. 3 whereby the distance between claw members can be selectively adjusted together with the versatility provided by having a plurality of attachment points in the primary yoke, e.g. apertures 52, 54, 56, 58, 60 permits virtually total adjustability of the pressure points along the backing strip and the proportionate force magnitudes transmitted at each of such attachment points.

Referring to FIG. 6, an alternative form of locking the various elements together at a desired attachment position is shown. A retractable bilobed pin 78 is shown made of a resilient material such as spring steel or plastic. The pin contains legs 80, 82 terminated by respective ends 85 having shoulder portions 84. The distance between the shoulder 84 and head of the pin 86 is at least the total transverse distance of a particular connection so that in its normal lockig position the legs 80, 82 are spread apart, as shown. The attachment position may be changed by manually or otherwise depressing together the ends 85 thus permitting the pin to be retracted from the transverse connecting aperture and relocated in the desired new aligning aperture.

Referring to FIGS. 7 and 8, an alternative connection is shown between secondary yoke 21 and the end of a primary yoke 25 (shown partially in phantom for clarity). The secondary yoke in this respect contains a through bore 88 of irregular shape extending transversely through the secondary yoke and along the bottom of which is formed a plurality of pin receiving corrugations 90. Slotted pin 92 is engaged in the corrugation or recess 90 and is held in that position partially by the biasing force applied by a biasing means such as leaf spring 94 connected to the secondary yoke at 96 and normally bearing down upon the slot formed in the pin member 92. Downward lateral extensions of the primary yoke 25 also engage the pin 92 and are locked by heads 98 of the pin. The attachment position may be easily changed by grasping the heads 98 of the pin, lifting upwardly against the resilience of the leaf spring 94, and dropping the pin into a different slot 90.

The superstructure of this invention may be made from various materials, such as stamped metal or molded plastics. In the case of the latter, it is important to space the apertures in the respective yokes sufficiently far enough apart, and also to use as small a diameter hole as can be utilized to minimize stress failures at these points.

An advantage of this invention in addition to those described above is reduced mold or part fabrication costs. For instance, a single pair of secondary yokes may be used with a single primary yoke to produce different length blades merely by varying the connection or attachment position between the primary and secondary yokes. This will result in a substantial reduction in mold costs in the case where the yokes are fabricated of molded plastic material. As an example, the balanced loading position shown in FIG. 1 might be a 16 inch blade, for instance. For a particular windshield wiper application it may be desirable to have such a balanced loading, particularly where the curvature in the windshield is not severe. If the wiper of FIG. 1 is adjusted so that the connection points between the primary and secondary yokes are at 40, 42, respectively, then by proper design one may produce a superstructure useful in an 18 inch blade. Because of the aforementioned problem with the longer size blades of insufficient pressure at the inner claws, this new adjusted blade will automatically compensate for such a problem by increasing the magnitude of the forces acting through the inner claws of both secondary yokes, while reducing the forces acting through the outer claws.

The above described preferred embodiments of this invention are meant to illustrate the invention and not to limit it in any way. A variety of variations and modifications will become apparent to those upon a reading of this specification who are skilled in the art. For instance, while the invention has been described with respect to pin or rivet connections between the various parts of the superstructure, it will be obvious that other specific fastening means may be employed which function in the intended manner without departing from the invention. Likewise, while the invention has been described with respect to a single primary yoke and a pair of secondary yokes, it should be clear that blades having additional primary and/or secondary yokes or tertiary yokes (which can also be considered "secondary yokes") may experience the same problems of force transmission and distribution through pressure points along the length of the blade, and these alternative constructions are also intended to be covered by this invention.

What is claimed is:

1. In a windshield wiper blade having a wiping element and a flexible backing member associated therewith, a pressure distributing superstructure attached to the backing member comprising a primary yoke and a pair of secondary yokes attached intermediate their ends to the primary yoke, said primary yoke having intermediate its ends means pivotally engageable with a pressure transmitting wiper arm at a pivot point, and said secondary yokes having a plurality of means attaching the flexible backing member at discrete spaced longitudinal points therealong thereby transmitting forces to the backing member at each of the spaced points, the improvement comprising:
    both of said attachments between the primary yoke and secondary yokes, and the pivotal attachment between the means of the primary yoke and of the wiper arm, respectively, being adjustable between a plurality of longitudinal points to form a plurality of selectable discrete attachment positions so that at least in one of the attachment positions the forces transmitted to the backing member on either side of a transverse plane passing through the pivot point are unbalanced with respect to one another.

2. A windshield wiper blade comprising:
    an elastomeric squeegee;
    a flexible squeegee retention element extending longitudinally on either side of the squeegee;
    at least two secondary pressure distributing yokes slidably attached at ends thereof to the squeegee retention element permitting relative longitudinal movement therebetween;
    a primary yoke connected to two of the secondary yokes intermediate the ends of the secondary yokes;
    at least one of said secondary yokes being slidably bifurcated so that the distance between ends of such secondary yoke attached to the squeegee retention member is selectively variable; and
    means for locking said bifurcated yoke at a predetermined position thereby establishing said distance between the ends of the bifurcated yoke.

3. The windshield wiper blade of claim 2 in combination with a pressure-applying wiper arm attached to said primary yoke.

4. The windshield wiper blade of claim 2 wherein said means includes cooperating apertures in the ends of the primary yoke and in each portion of the bifurcated secondary yokes, and pin means lockingly engaging said apertures in relative position.

5. An improved adjustable pressure transmitting superstructure for use in a windshield wiping apparatus comprising:
    an elongated primary yoke connectible intermediate its ends to a wiper arm supplying pressure to the wiper blade;
    a pair of secondary yokes each having respective end portions formed with claws for attachment to a wiper refill, each of the secondary yokes being pivotally connected intermediate its end portions to the primary yoke;
    both of said connections between the wiper arm and primary yoke on the one hand, and between the primary yoke and at least one of the secondary yokes, on the other hand, being adjustable longitudinally with respect to the superstructure between a series of pivot positions, whereby loading transmitted from the wiper arm may be selectively unbalanced with respect to a plane transversely bisecting the primary yoke and the planes transversely bisecting at least one of the secondary yokes.

6. In combination, a windshield wiper comprising an elastomeric squeegee member, a squeegee retaining backing member, and a superstructure attached to the backing member for transmitting pressure thereto comprising:

an elongated primary yoke connectible intermediate its ends to wiper arm means supplying pressure to the wiper blade and the yoke having at least one transverse bore at its end extremity;

at least one secondary yoke having respective end portions attached to said backing member, said secondary yoke having a transverse bore intermediate its end portions; and d a retractable pivot pin joining said primary and secondary yoke through side-by-side alignment of their respective transverse bores;

said pivot pin having a head at one end and a pair of shoulder portions at the other end jointed together by a bilobed resilient body portion, whereby the pin may be retracted from the bores to disengage the primary from the second yoke by depressing together the shoulder portions, without exceeding the yield point of the bilobed resilient body portion, and withdrawing the pin through the aligned bores.

7. In combination, a wiper arm connector having a through bore and a windshield wiper having a through bore coupled together with the wiper arm connector by a connecting pin joining in side-by-side alignment the respective bores, said connecting pin comprising a head portion at one end of the bores and located outside the bores, a bilobed resilient body contained within the bores and normally split apart, the bilobed body terminating at the outside of the bores opposite the head portion in a pair of shoulder stop portions for retention of the pin in assembled connecting relationship, whereby the arm connector and windshield wiper may be disconnected by depressing together the shoulder portions of the pin and sliding the pin out through the aligned bores.

8. In a windshield wiper blade having a wiping element and a wiping element retention member engaged therewith, an improved pressure distributing superstructure attached to the wiper element retention member comprising:

an elongated primary yoke connectible intermediate its ends to a wiper arm supplying pressure to the wiper blade;

a pair of secondary yokes each having at least one of its respective end portions attached to the wiper element retention member, each of the secondary yokes being pivotally connected intermediate its end portions to the primary yoke, at least one of said secondary yokes being bifurcated into two portions slidably engageable with one another and distensible so that the distance between the end portions of the secondary yoke, at least one being attached to the wiper element retention member, being selectively variable.

9. The windshield wiper blade of claim 8 wherein at least one of the secondary yokes has its respective end portions slidably attached to the wiper element retention member.

10. The windshield wiper blade of claim 8 wherein the bifurcated yoke has a plurality of longitudinally spaced apertures forming said pivot points, and said primary yoke has a cooperating aperture in its end for alignment with the secondary yoke, and means for locking said primary and secondary yokes together through the apertures.

11. In a windshield wiper blade having a wiping element and a wiping element retention member engaged therewith, an improved pressure distributing superstructure attached to the wiper element retention member comprising:

an elongated primary yoke connectible intermediate its ends to a wiper arm supplying pressure to the wiper blade;

a pair of secondary yokes each having at least one of its respective end portions attached to the wiper element retention member, each of the secondary yokes being pivotally connected intermediate its end portions to the primary yoke;

said pivotal connection between the primary yoke and at least one of said secondary yokes being adjustable longitudinally with respect to the blade between a plurality of pivot points, at least one of which pivot points is spaced from the plane which transversely bisects the secondary yoke; and said connection between the elongated primary yoke and the wiper arm being adjustable longitudinally with respect to the blade between a plurality of pivot points.

* * * * *